US012624708B2

(12) United States Patent
Kelley et al.

(10) Patent No.: US 12,624,708 B2
(45) Date of Patent: May 12, 2026

(54) JET PUMP CLAMPS AND METHODS FOR USE IN A NUCLEAR REACTOR JET PUMP

(71) Applicant: GE-Hitachi Nuclear Energy Americas LLC, Wilmington, NC (US)

(72) Inventors: Kayla R. Kelley, Wilmington, NC (US); Mark Sumner, Wilmington, NC (US); Jack T. Matsumoto, Wilmington, NC (US); Christopher M. Welsh, Wilmington, NC (US); James Scavo, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 18/520,522

(22) Filed: Nov. 27, 2023

(65) Prior Publication Data

US 2024/0175450 A1 May 30, 2024

Related U.S. Application Data

(60) Provisional application No. 63/427,993, filed on Nov. 25, 2022.

(51) Int. Cl.

| | |
|---|---|
| *F04F 5/44* | (2006.01) |
| *G21C 15/25* | (2006.01) |
| *F16B 2/06* | (2006.01) |

(52) U.S. Cl.
CPC ............... *F04F 5/44* (2013.01); *G21C 15/25* (2013.01); *F16B 2/065* (2013.01)

(58) Field of Classification Search
CPC .... F04F 5/44; F04F 5/00; G21C 15/25; G21C 17/017; F16B 2/065; E04D 13/08; F16L 3/00
See application file for complete search history.

(56) References Cited

U.S. PATENT DOCUMENTS

| | | | | |
|---|---|---|---|---|
| 3,141,686 A | * | 7/1964 | Smith ..................... | F16L 23/02 |
| | | | | 277/621 |
| 6,108,391 A | * | 8/2000 | Deaver ................... | F16L 13/06 |
| | | | | 376/407 |

(Continued)

FOREIGN PATENT DOCUMENTS

| | | | | |
|---|---|---|---|---|
| ES | 2423355 A2 | * | 9/2013 | .......... G21C 13/032 |
| JP | 2012-037517 | | 2/2012 | |

OTHER PUBLICATIONS

G.L. Stevens et al., "Jet Pump Flaw Evaluation Procedures" 8th Int. Conf. on Nuclear Eng., Jan. 2000.

(Continued)

*Primary Examiner* — Eret C McNichols
(74) *Attorney, Agent, or Firm* — Alley IP

(57) ABSTRACT

Jet pump clamps fit to modified jet pump assemblies at the riser pipe-restrainer bracket junction. The clamp can secure the restrainer bracket and riser pipe, relieving any welds between the same stress in the same, while preventing the restrainer bracket from moving. The clamp may include multiple members on either side of the restrainer bracket that fit into surfaces of the riser pipe. When these members are drawn together through clamping action, the underlying riser pipe is compressed. Similarly, vertically-adjustable members may seat into and/or through the restrainer bracket to hold the bracket steady. Jet pump assemblies may be prepared by forming grooves in the riser pipe and hole(s) in the restrainer bracket(s) and spherical indentations about the same. Clamps may then be installed on the grooves and through the hole(s) at installation or during a maintenance outage in a commercial nuclear power plant.

19 Claims, 7 Drawing Sheets

(56) References Cited

U.S. PATENT DOCUMENTS

| | | | |
|---|---|---|---|
| 7,627,074 B2 | 12/2009 | Erbes et al. | |
| 8,170,174 B1 * | 5/2012 | Lentner | G21C 15/25 |
| | | | 403/261 |
| 8,356,787 B2 | 1/2013 | DeFilippis | |
| 8,422,618 B2 | 4/2013 | Wroblewski et al. | |
| 8,731,134 B2 | 5/2014 | DeFilippis et al. | |
| 8,819,911 B2 | 9/2014 | Sprague et al. | |
| 8,964,929 B2 | 2/2015 | Sprague et al. | |
| 8,983,018 B2 * | 3/2015 | Lentner | G21C 17/017 |
| | | | 376/392 |
| 10,753,374 B2 | 8/2020 | Lane et al. | |
| 11,538,598 B2 | 12/2022 | Lane et al. | |
| 2007/0189434 A1 | 8/2007 | Jensen | |
| 2011/0280360 A1 | 11/2011 | Flanigan et al. | |
| 2012/0032064 A1 * | 2/2012 | Defilippis | G21C 15/25 |
| | | | 248/675 |
| 2012/0155598 A1 | 6/2012 | Lentner et al. | |
| 2012/0288053 A1 | 11/2012 | Sprague et al. | |
| 2013/0061441 A1 | 3/2013 | Koepke | |
| 2017/0321726 A1 * | 11/2017 | Lane | F16B 2/185 |

OTHER PUBLICATIONS

G. Soto-Mendoza et al., "Cross Flow Analysis over the Jet Pumps of BWR-5 Reactor" Sci & Tech. of Nuclear Installations, vol. 2021, Mar. 27, 2021.

WIPO, International Search Report in corresponding PCT application PCT/US2023/081227, Apr. 3, 2024.

WIPO, Written Opinion in corresponding PCT application PCT/US2023/081227, Apr. 3, 2024.

* cited by examiner

5

301

302

3

JET PUMP CLAMPS AND METHODS FOR USE IN A NUCLEAR REACTOR JET PUMP

RELATED APPLICATIONS

This application claims priority under 35 U.S.C. § 119 to U.S. Provisional Application 63/427,993, filed Nov. 25, 2022 and incorporated by reference herein in its entirety.

BACKGROUND

FIG. 1A is a front view of a related art nuclear boiling water reactor (BWR) jet pump assembly 8. The major components of jet pump assembly 8 include riser pipe 3 and two inlet mixers 4 that insert into respective diffusers 2. Shroud support plate 1 receives fluid from diffusers 2 and supports the same, allowing jet-pump driven fluid flow through an annulus housing jet pump assembly 8. Jet pump restrainer brackets 5 are welded to riser pipe 3 to stabilize movement of inlet mixers 4 and reduce movement of and leakage at the slip joint that exists at the interface between inlet mixers 4 and diffusers 2. Restrainer brackets 5 minimize relative movement between inlet mixers 4 and restrainer brackets 5 to minimize leakage or damage around the slip joint.

FIG. 1B is a top view of jet pump restrainer brackets 5 as viewed from line B-B of FIG. 1A. As seen in FIG. 1B, each bracket 5 may be welded directly to opposite sides of an outer perimeter of riser pipe 3. One or more guide ears 6 and/or other alignment structures may ensure that inlet mixer 4 and diffuser 2 properly align and/or remain confined by corresponding bracket 5. G. L. STEVENS et al, "Jet Pump Flaw Evaluation Procedures" 8th International Conference on Nuclear Engineering, January 2000, and G. SOTO-MENDOZA et al., "Cross Flow Analysis over the Jet Pumps of a BWR-5 Reactor" Science and Technology of Nuclear Installations, Vol. 2021, Mar. 27, 2021, describe other related art jet pump assembly operations and are incorporated by reference herein in their entireties.

This background provides a useful baseline or starting point from which to better understand some example embodiments discussed below. Except for any clearly-identified third-party subject matter, likely separately submitted, this Background and any figures are by the Inventor(s), created for purposes of this application. Nothing in this application is necessarily known or represented as prior art.

SUMMARY

Example embodiments include jet pump clamps, modified jet pump assemblies accommodating the same, and methods of forming and installing such clamps and assemblies in a nuclear reactor. Example embodiment clamps are installable on the riser pipe and restrainer bracket joined to the riser pipe. The clamp can wholly replace welds and other connections between the restrainer bracket and riser pipe, relieving stress in the same and holding the bracket and riser pipe in secured orientations. Clamps can also compress the riser pipe inside the clamp, relieving vertical strains on the pipe that may cause crack propagation. Example embodiment jet pump assemblies may include indentations in an outer surface of the riser pipe that receives portions of the clamp and vertically secures the pipe and clamp. Different members of the clamp may be drawn together to push the pipe together vertically, providing the vertical compression through these indentations. The assemblies may further include restrainer brackets at the clamps with one or more vertical holes through which the clamp can pass and seat. Example embodiment clamps may include holding members that can be adjusted vertically to meet the restrainer bracket and seat onto either side of the holes in the same. This may secure the restrainer bracket and riser pipe in all directions. Example embodiment clamps may tighten and hold through a variety of structures, including adjustable draw bolts passing through all structures that can be tightened with threaded crimp nuts. The draw bolts and any other biasing structure may seat against the clamp body and restrainer bracket with washers that match a surface of the body and bracket, including partially spherical surfaces.

Example methods may prepare jet pump assemblies and/or install clamp components on the same. Example methods can be performed at any time, during jet pump assembly fabrication, installation, or maintenance outage. Grooves in the riser pipe and hole(s) in the restrainer bracket(s), as well as surfaces about the same, may be formed through any shaping process, including forging and machining. Clamps may then be installed on the grooves and through the hole(s) in any manner, and eventually biased to impart internal compression on the riser pipe about the restrainer bracket, while holding the bracket and riser pipe immovable relative to each other.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1A:
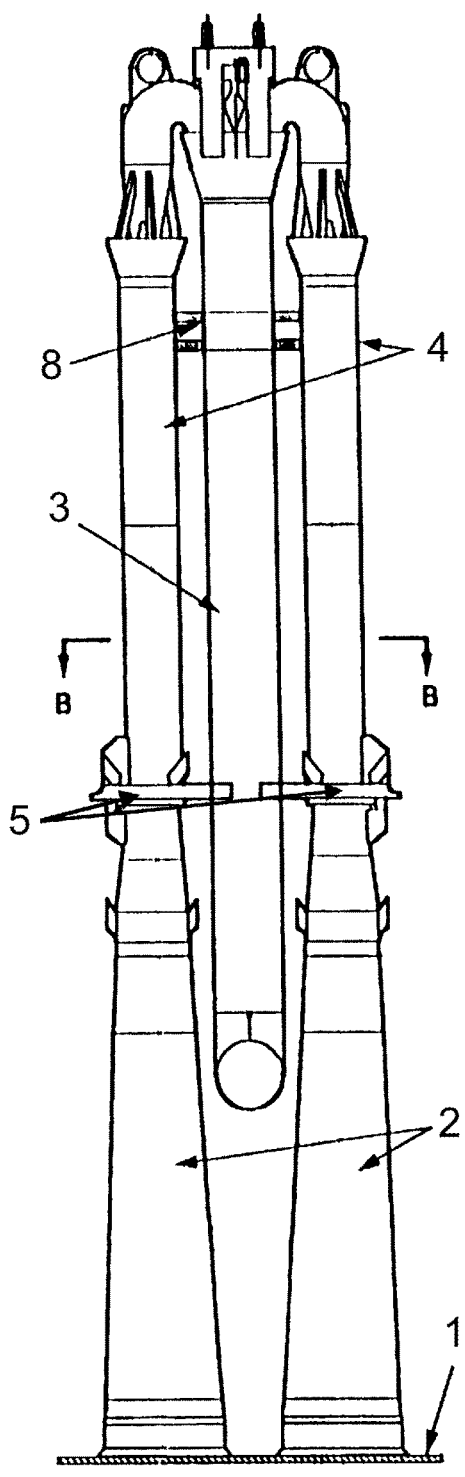
FIG. 1A is an illustration of a related art jet pump assembly for use in a nuclear power plant.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Membership terms like "comprises," "includes," "has," or "with" reflect the presence of stated features, characteristics, steps, operations, elements, and/or components, but do not themselves preclude the presence or addition of one or more other features, characteristics, steps, operations, elements, components, and/or groups thereof. Rather, exclusive modifiers like "only" or "singular" may preclude presence or addition of other subject matter in modified terms. The use of permissive terms like "may" or "can" reflect optionality such that modified terms are not necessarily present, but absence of permissive terms does not reflect compulsion. In listing items in example embodiments, conjunctions and inclusive terms like "and," "with," and "or" include all combinations of one or more of the listed items without exclusion of non-listed items. The use of "etc." is defined as "et cetera" and indicates the inclusion of all other elements belonging to the same group of the preceding items, in any "and/or" combination(s). Modifiers "first," "second," "another," etc. do not confine modified items to any order. These terms are used only to distinguish one element from another; where there are "second" or higher ordinals, there merely must be that many number of elements, without necessarily any difference or other relationship among those elements.

When an element is related, such as by being "connected," "coupled," "on," "attached," "fixed," etc., to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.).

As used herein, singular forms like "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. Relative terms such as "almost" or "more" and terms of degree such as "approximately" or "substantially" reflect 10% variance in modified values or, where understood by the skilled artisan in the technological context, the full range of imprecision that still achieves functionality of modified terms. Precision and non-variance are expressed by contrary terms like "exactly."

As used herein, "axial" and "vertical" directions are the same up or down directions oriented along the major axis of a nuclear reactor, often in a direction oriented with gravity. "Transverse" directions are perpendicular to the "axial" and are side-to-side directions at a particular axial height, whereas "radial" is a specific transverse direction extending perpendicular to and directly away from the major axis of the nuclear reactor.

The structures and operations discussed below may occur out of the order described and/or noted in the figures. For example, two operations and/or figures shown in succession may in fact be executed concurrently or may be executed in the reverse order, depending upon the functionality/acts involved. Similarly, individual operations within example methods described below may be executed repetitively, individually or sequentially, so as to provide looping or other series of operations aside from exact operations described below. It should be presumed that any embodiment or method having features and functionality described below, in any workable combination, falls within the scope of example embodiments.

The inventors have recognized that riser pipes and restrainer brackets in nuclear reactor jet pumps are susceptible to material degradation and failure due to unique operating conditions in the jet pumps. Welds holding the restrainer brackets to the riser pipe, the so-called RS-6/7 welds running vertically and transversely about a base of the restrainer brackets, develop intergranular stress corrosion cracks due to flow-induced vibration and nuclear reactor conditions. These cracks may contribute to fatigue cracks in the riser pipe itself due to stresses from expansion in the riser pipe. The inventors have recognized a need to make unnecessary these joining welds entirely, impart compressive stress in the riser pipe to avoid fatigue, all while still securing the restrainer bracket and riser pipe in the jet pump assembly. To overcome these newly-recognized problems as well as others, the inventors have developed example embodiments and methods described below to address these and other problems recognized by the inventors with unique solutions enabled by example embodiments.

The present invention is jet pump clamps and methods of forming jet pump assemblies with jet pump clamps. In contrast to the present invention, the few example embodiments and example methods discussed below illustrate just a subset of the variety of different configurations that can be used as and/or in connection with the present invention.

Figure 2:
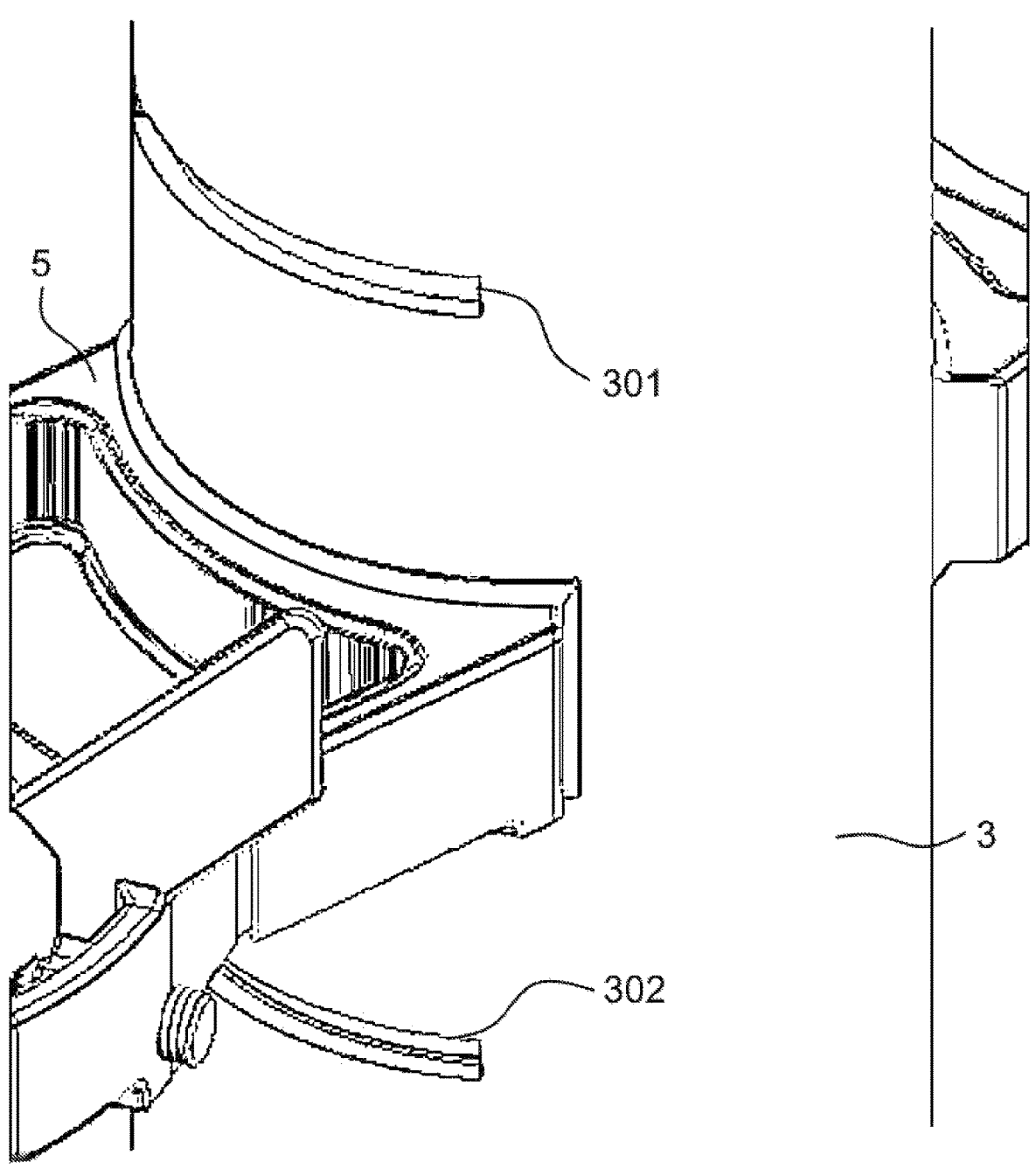
FIG. 2 is an illustration of an example embodiment riser pipe as formed by an example method.

FIG. 2 illustrates structures of an example method of preparing a jet pump assembly for clamping with example embodiments. As shown in FIG. 2, at least one of upper groove 301 and lower groove 302 is formed in riser pipe 3 of a jet pump assembly of a reactor. In this way riser pipe 3 of FIG. 1A is changed into an example embodiment riser pipe 3 of FIG. 2, compatible with example embodiment clamps. Where riser pipe 3 runs vertically, grooves 301 and/or 302 may extend or have a depth in the transverse direction, with a width extending about an outer perimeter of riser pipe 3. The assembly containing riser pipe 3 may be similar to existing assemblies in US commercial BWR plants, or in a new plant having a jet pump assembly. Upper groove 301 may be formed above restrainer bracket 5, and lower groove 302 may be formed below restrainer bracket 5.

Grooves 301 and 302 may be any distance from restrainer bracket 5 to match positioning of example embodiment clamps discussed below. Grooves 301 and 302 may be any length and depth to similarly match a tongue(s) of example embodiment clamps discussed below, such as about 75 degrees around a surface of riser pipe 3 each centered at a midpoint of restrainer bracket 5 joining to riser pipe 3 and half an inch or less deep. While only a single, continuous groove may be used, it is also possible to form multiple grooves from dashes, counter-bored spots, or any other shape and number that permits joining into riser pipe 3. Grooves 301 and 302 may not extend entirely through the material of riser pipe 3, so as to maintain a closed flow path in the same, in which case they may have any depth that maintains structural integrity of riser pipe 3. Groove 301 and/or 302 may be formed through any process, including cutting with a welding or laser torch, machining, such as with electrical discharge machining, chemical etching, forging pipe 3 with grooves 301 and/or 302, etc. In example methods, grooves 301 and 302 may be formed during fabrication of riser pipe 3, during installation of riser pipe 3 in the reactor, following operation of riser pipe 3 in an existing reactor, such as during a maintenance outage, or at any other time.

Figure 1B:
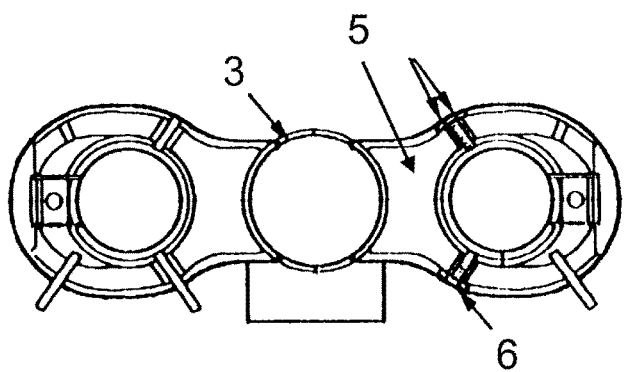
FIG. 1B is a detail of the related art jet pump assembly of FIG. 1A.
Figure 3:
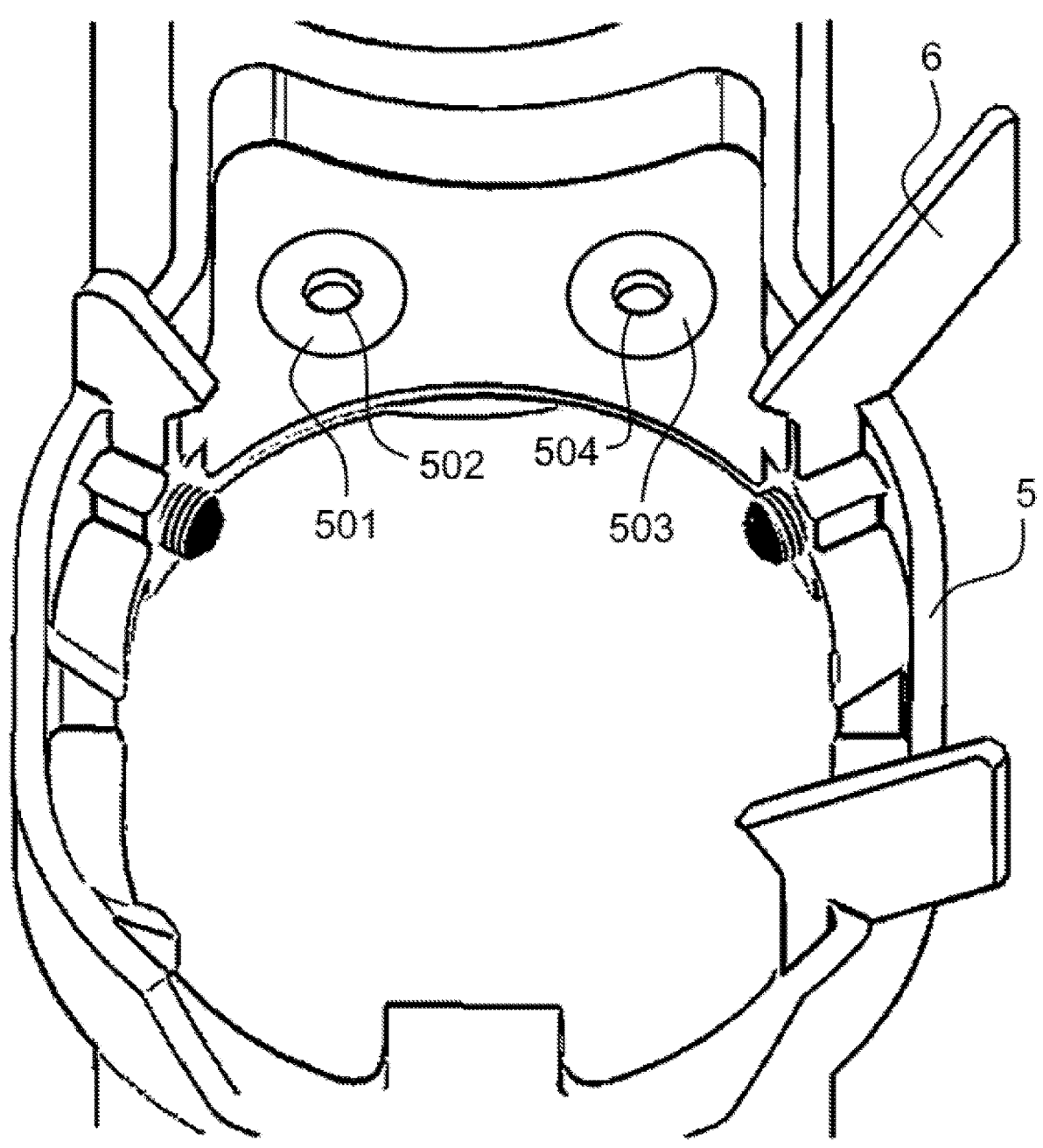
FIG. 3 is an illustration of an example embodiment restrainer bracket as formed by an example method.

FIG. 3 illustrates other structures of the example method of preparing a jet pump assembly for clamping with example embodiments. As shown in FIG. 3, at least one of left clamp hole 502 and right clamp hole 504 is formed in restrainer bracket 5 of a jet pump assembly of a reactor. In this way, restrainer bracket 5 of FIG. 1B is formed into example embodiment restrainer bracket 5 of FIG. 3 compatible with example embodiment clamps. Holes 502 and/or 504 pass completely through bracket 5 in a vertical direction. For example, holes 502 and/or 504 may be on a transverse, flat bib or gauge of bracket 5. Restrainer bracket 5 and the assembly containing the same may be similar to existing assemblies in US commercial BWR plants, or in a new plant having a jet pump assembly. Holes 502 and 504 may be at any position in restrainer bracket 5 to match positioning of example embodiment clamps discussed below. Left clamp hole 502 and right clamp hole 504 may be formed, as shown in FIG. 3 for example, equidistant from a midpoint of restrainer bracket 5 where it is welded to riser pipe 3 (FIG. 1A).

Bushing seating surfaces 501 and 503 may be formed about respective holes 502 and 504, to provide improved fit and clamping surface for structures joining to the same, including example embodiment clamps discussed below. For example, seating surfaces 501 and 503 may be spherical or ellipsoidal section surfaces centered about holes 502 and 504 on both top and bottom sides of bracket 5. Any seating surface 501 and/or 503 may not fully extend through bracket 5 and may preserve a thickness of bracket 5 to maintain structural integrity of the same.

Holes 502 and/or 504 may be any shape to similarly match a bolt(s) or other pass-through structure of example embodiment clamps discussed below, such as a hole with an inch or less diameter. While only a single hole may be used, it is also possible to form any number of holes, with optional seating surfaces, from any shape and number that permits passing through restrainer bracket 5. Holes 502 and 504 and surfaces 501 and 503 may be formed through any process, including cutting with a welding or laser torch, machining, such as with electrical discharge machining, chemical etching, forging restrainer bracket 5 with holes, etc. In example methods, holes and surfaces 501-504 may be formed during fabrication of restrainer bracket 5, during installation of bracket 5 in the reactor, following operation of bracket 5 in an existing reactor, such as during a maintenance outage, or at any other time.

Example methods may form holes in restrainer bracket 5 and grooves in riser pipe 3 simultaneously or at distinct points in time. For example, holes 502 and 504 may be fabricated into restrainer bracket 5 during manufacture, and grooves 301 and 302 may be machined into riser pipe 3 during a maintenance outage in which example embodiment clamps are installed. While holes and grooves are shown from a single side in FIGS. 2 and 3, symmetrical or distinct holes and grooves may be formed on other sides of riser pipe 3 and restrainer bracket 5 to accommodate example embodiment clamps discussed below. Similarly, these holes and grooves on other sides may be formed simultaneously or at distinct points in time.

Figure 4:
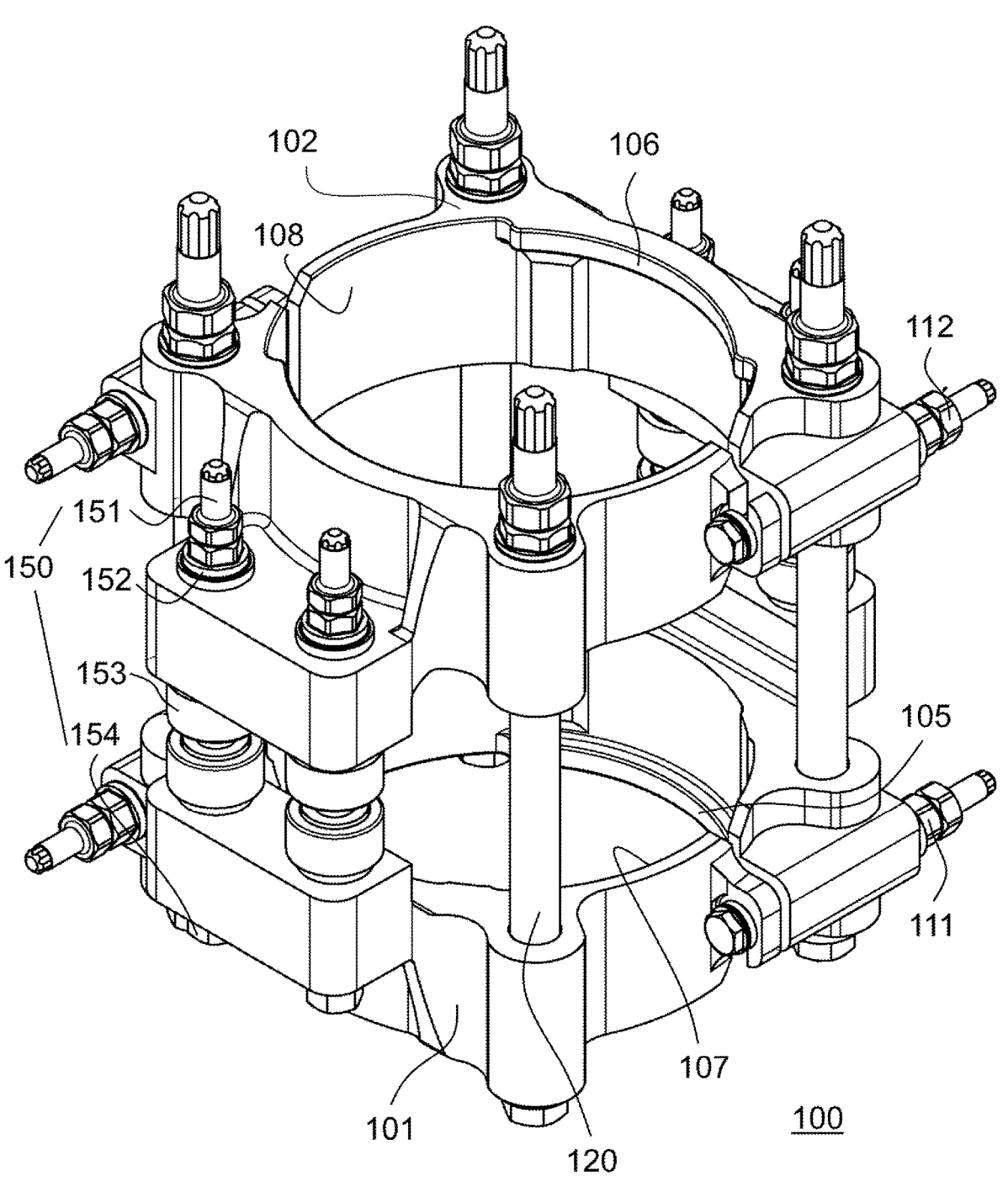
FIG. 4 is a perspective view of an example embodiment jet pump clamp.
Figure 5:
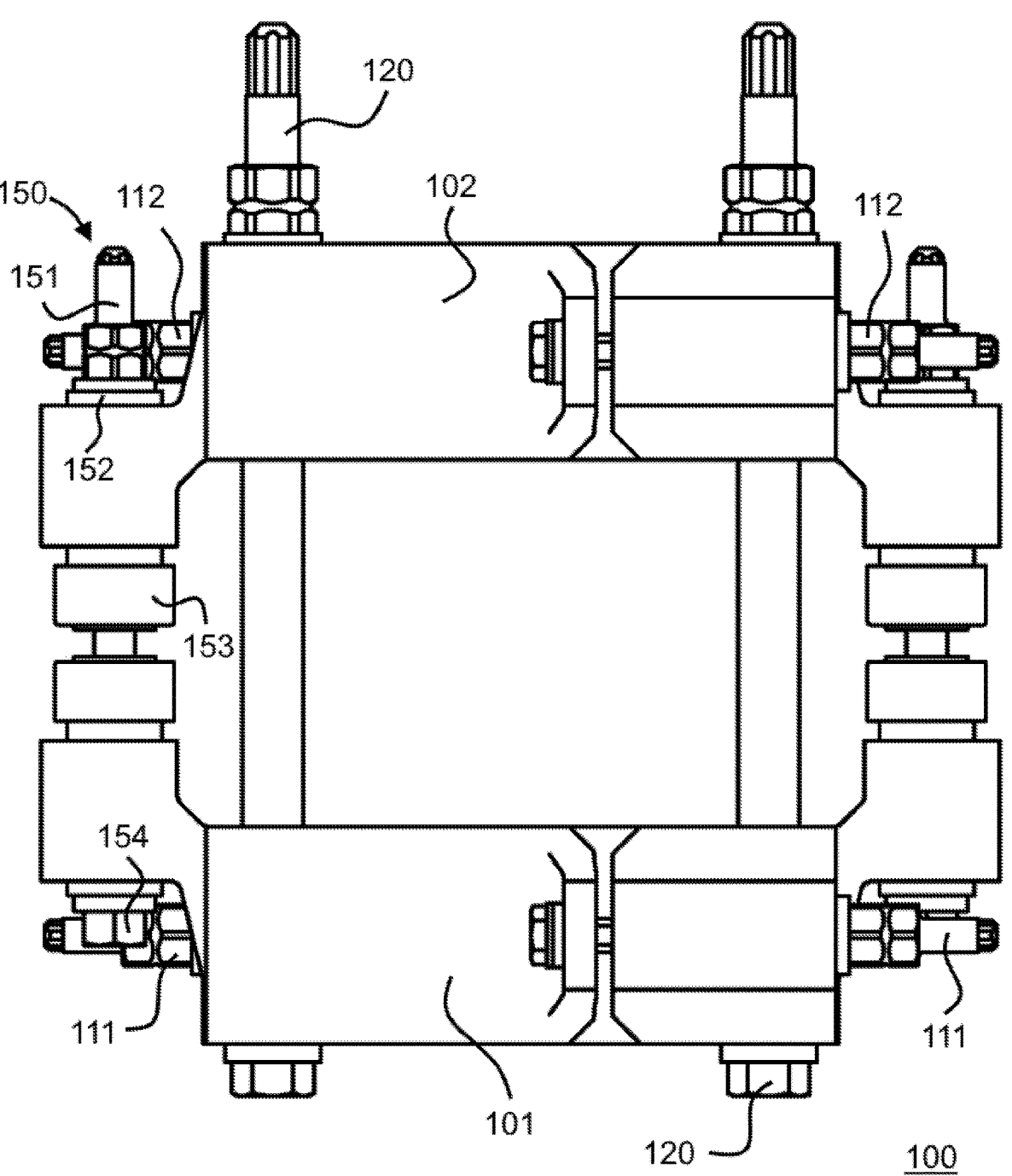
FIG. 5 is a side view of the example embodiment jet pump clamp of FIG. 4.
Figure 6:
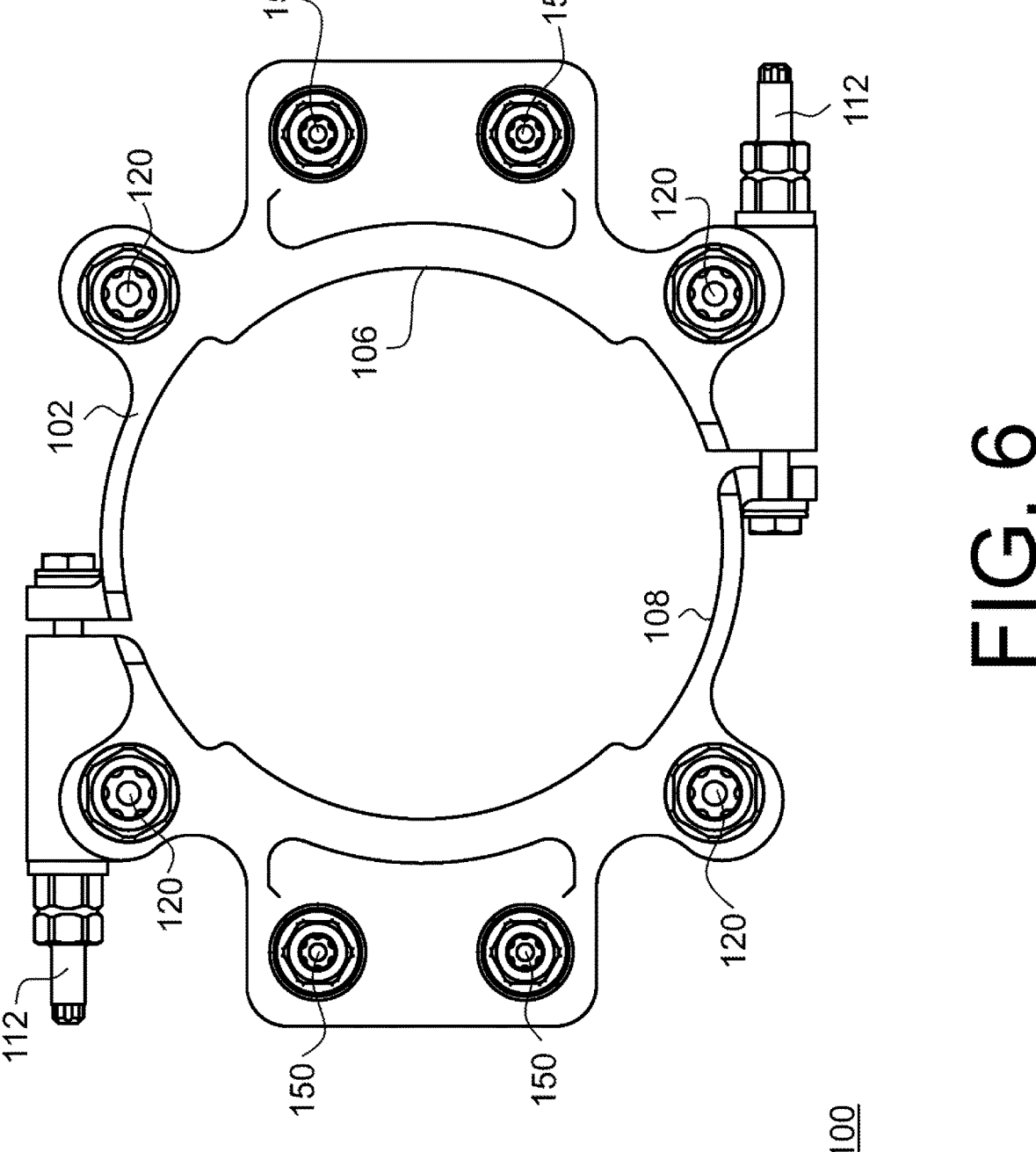
FIG. 6 is a top view of the example embodiment jet pump clamp of FIG. 5.

FIG. 4 is an illustration of an example embodiment jet pump clamp 100 useable in example methods. FIG. 4 is a perspective view of example embodiment clamp 100, FIG. 5 is a top view of clamp 100 showing an upper riser pipe clamp member, and FIG. 6 is a side view of clamp 100. As shown in FIG. 4, example embodiment jet pump clamp 100 includes lower clamp member 101 and upper clamp member 102. Clamp members 101 and 102 are shaped to fit and secure to riser pipe 3 (FIG. 1A) of the jet pump assembly, to allow external and internal forced to be applied to pipe 3. To secure, clamp members 101 and 102 include tongue 105 and 106 extending from inner surfaces 107 and 108 that fit around the riser pipe. Tongues 105 and 106 are shaped to seat into grooves 301 and 302 (FIG. 2) formed by example methods in riser pipe 3 (FIG. 2). As such, tongues 105 and 106 may take on any shape or size that match the grooves (and vice versa), to prevent unrestricted vertical movement of clamp members 101 and 102 with respect to the pipe. Similarly, multiple tongues 105 and 106 may be used, to fit into different grooves formed on different sides of the riser pipe. While inner surfaces 107 and 108 are shaped and sized to fit around the riser pipe, they may have any desired additional shaping. For example, inner surfaces 107 and 108 may have an inner diameter sized to directly contact and bias an outer perimeter of the riser pipe, or inner surfaces 107 and 108 may be entirely spaced from the rise pipe except for tongues 105 and 106, or only selectively contact the riser pipe, through proper sizing and extensions, for example.

Clamp members 101 and 102 may expand or open, such as via rotation about a joint, cinching, etc., or be multi-piece to fit around and secure tongues 105 and 106 with the riser pipe. Example methods may position each clamp member 101 and 102 about the respective grooves on the riser pipe and fasten, close, join, or otherwise secure clamp members 101 and 102 to the riser pipe in the vertical direction by seating tongues 105 and 106 into respective grooves. For example, as shown in FIG. 4, clamp fastener 112 in upper clamp member 102 and clamp fastener 111 in lower clamp member 102 may insert into respective pockets of the multi-piece members and draw the pieces together and ultimately secure the same in a transverse direction. As best seen in FIGS. 5 and 6, multiple clamp fasteners 112 may be used in each member to secure the pieces of each member from each side.

Clamp fasteners 111 and 112 may use any structure to secure upper clamp member 102 and lower clamp member 101 to the riser pipe. For example, two clamp fasteners 111 and two clamp fasteners 112 may be used on opposite sides of each respective clamp member 101 and 102. Clamp fasteners 111 and 112 may each use a draw bolt with a nut at one end and a threaded end at the other end that passes entirely through matching holes of a member 101/102. A crimp nut with opposite internal threads may ride on the threaded end and transversely tighten on the bolt. When a desired tightness is reached in example methods, the crimp nut may be deformed down onto the draw bolt, preventing further rotation and loosening. Washers, such as those with spherical sectioned-surfaces or any other shape matching surfaces about holes or bosses of members 101 and 102 may be positioned at each end under the crimp nut and bolt nut to increase and/or match surface areas between clamp fastener and clamp member. As discussed above, any other fastener may also be used, including ratchets, cinches, vise jaws, etc. that allows installation of clamp members 101 and 102 about riser pipe to vertically secure into grooves of the same.

Example methods may vertically connect upper clamp member 102 and lower clamp member 101 and even compress the two together. Such joining may be executed at any time, before or after the clamp members have been vertically secured to a riser pipe. Any compressing or biasing of the upper and lower clamp members 102 and 101 may be executed after they are joined to the riser pipe, in order to impart compressive vertical forces in the riser pipe.

For example, as shown in FIG. 4, vertical connector 120 may vertically join and/or secure lower clamp member 101 to upper clamp member 102. Vertical connector 120 may pass through matching bosses or pockets of members 101 and 102 to vertically join and align the members. Multiple vertical connectors 120 may be used, such as four connectors 120 shown in FIG. 6 equally spaced about an exterior of upper clamp member 102. Vertical connectors 120 may each use a draw bolt with a nut at one end and a threaded end at the other end that passes entirely through matching holes of a member 101/102. A crimp nut with opposite internal threads may ride on the threaded end and transversely tighten on the bolt. When a desired tightness is reached in example methods, the crimp nut may be deformed down onto the draw bolt, preventing further rotation and loosening. Washers, such as those with spherical sectioned-surfaces or any other shape matching pocket surfaces surrounding the holes of members 101 and 102 may be positioned at each end under the crimp nut and bolt nut to increase and/or match surface areas between vertical connector and clamp member. Other connectors may also be used, including ratchets, cinches, vise jaws, etc. that allow vertical securing and potentially further vertical clamping of members 101 and 102 about the riser pipe.

Through the flexibility of clamp members 101 and 102 and joining structures therein, example methods may install the members about a riser pipe together or separately, and further impart desired compression in the underlying riser pipe at any stage. For example, lower clamp member 101 may be individually installed on the riser pipe and secured to the same via tongue 105 and groove 302 (FIG. 2). Upper clamp member 102 may separately be installed on the riser pump with similar securing. One or more vertical connectors 120 may then be connected between installed clamp members 101 and 102, regardless of final vertical position, and draw members 101 and 102 vertically together or apart, imparting similar forces in the underlying riser pipe to which the members are secured. The securing of example embodiment clamp 100 to an underlying riser pipe, as well as compression of the pipe, may functionally replace the pipe at the restrainer bracket as well as mitigate fatigue crack growth bay maintaining the riser pipe in needed compression.

Example methods may independently secure upper clamp member 102 and lower clamp member 101 to restrainer bracket 5 (FIG. 1B) regardless of vertical positioning of restrainer bracket 5 and example embodiment clamp 100. Such securing may be executed at any time, before or after the clamp members have been vertically secured to a riser pipe. Any vertical compressing or biasing of the upper and lower clamp members 102 and 101 may be executed after members 101 and 102 are joined to the riser pipe, to impart compressive vertical forces in the riser pipe. And any joining to restrainer bracket 5 may be executed independently of such vertical compression or biasing of the riser pipe.

As shown in FIG. 4, example embodiment jet pump clamp 100 includes restrainer bracket constraint 150 configured to secure restrainer bracket 5 (FIG. 1B) with clamp 100. Any number of bracket constraints 150 may be used in clamp 100; in the example of FIG. 4, two constraints 150 are used on opposite sides, to match with two separate restrainer brackets 5 on opposite sides of riser pipe 3 (FIG. 1A). Constraint 150 passes through clamp hole 502 and/or 504 in restrainer bracket 5 (FIG. 3), with the positioning of constraint 150 matching the positioning of any holes as formed by example methods in restrainer bracket 5 (or vice versa). Constraint 150 thus prevents a restrainer bracket from detaching or moving relative to clamp 100 and any riser pipe to which clamp 100 is secured.

Constraint 150 may take on any form that secures to a restraint bracket, including clamps, screws, harnesses, augur and tang locks, etc. For example, as shown in FIG. 5, constraint 150 may include a draw bolt 154 with a nut at one end and a threaded end at the other end that passes entirely through matching holes of members 101 and 102 and hole 502 or 504 of restrainer bracket 5. Crimp nut 151 with opposite internal threads may ride on the threaded end and transversely tighten on bolt 154. When a desired tightness is reached in example methods, crimp nut 151 may be deformed down onto draw bolt 154, preventing further rotation and loosening.

Threaded bushing 152 may seat into threads inside the holes of member 102 in constraint 150 and vertically displace around draw bolt 154 via rotation. Retainer 152 may pair bushing 152 with a washer that matches seating surfaces 501 or 503 (FIG. 3). For example, washers on retainer 152 may have spherical sectioned-surfaces or any other shape matching surfaces 501 or 503 to increase and/or match surface areas between vertical connector and clamp member. Threaded bushing 152 may be rotated on the internal threads to vertically raise or lower retainer 153 with washer. This may provide any desired vertical displacement of retainer 153 and thus restrainer bracket 5 pressing against the same. A matching set of bushings and retainers with washers may be on another side of draw bolt 154 in clamp member 101. These sets of bushings, retainers, and washers may thus hold restrainer bracket 5 (FIG. 3) at any vertical position and secure with clamp 100.

Example methods may install and tighten constraint 150 at any time to provide desired positioning and/or tensioning in restrainer brackets. For example, after example embodiment clamp 100 has both lower clamp member 101 and upper clamp member 102 secured to a riser pipe about the restrainer bracket, constraint 150 may be installed through clamp 100 and the restrainer bracket by passing draw bolt 154 through holes in all of members 101 and 102 and the restrainer bracket. Draw bolt 154 may be tightened by rotation of crimp nut 151, with is then deformed to lock draw bolt 154. Bushing 152 in member 101 may be rotated until retainer 153 and any washer thereon are seated against the restrainer bracket, and bushing in member 102 may be similarly rotated, such that the restrainer bracket is captured and secured with clamp 100 and riser pipe connected thereto in every direction. In this way the RS-6/7 weld in the restrainer bracket may be relieved, and any crack growth may be arrested in the restrainer bracket joining to the riser pipe.

Figure 7:
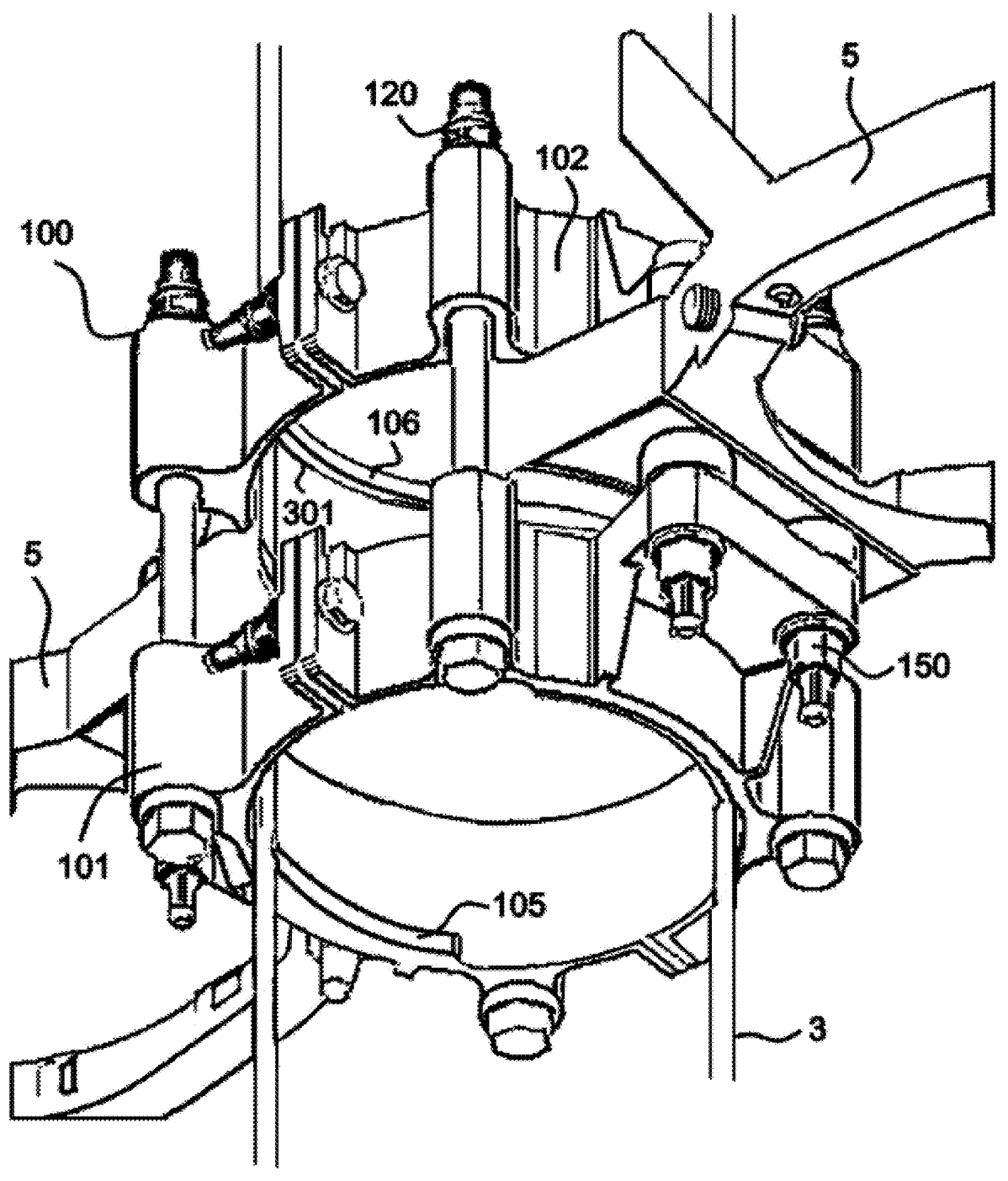
FIG. 7 is an illustration of an example embodiment jet pump clamp as installed on a riser pipe of a jet pump in a nuclear reactor.

FIG. 7 is an illustration of another example embodiment clamp 200 joined to riser pipe 3 following example methods of forming and installing the clamp. As seen in FIG. 7, clamp 200 may use a slightly different closing mechanism for lower clamp member 101 and upper clamp member 102, with nearly any closing or joining structure useable in example embodiments.

The components of example embodiment clamps are fabricated of materials that are compatible with an operating nuclear reactor environment, including materials that maintain their physical characteristics when exposed to high-temperature fluids and radiation. Direct contact points may be lubricated and fabricated of alternating or otherwise compatible materials to prevent seizing, fouling, or metal-on-metal reactions. Neutron poisons and highly-activated materials, such as halides or cobalt, may be eliminated or reduced. For example, draw bolts and washers may be fabricated of XM-19, while clamp members and constraint elements may be fabricated of 316-nuclear grade stainless steel. Other metals such as other stainless steels and iron alloys, nickel alloys, zirconium alloys, etc. are useable for similar components.

Example embodiments and methods thus being described, it will be appreciated by one skilled in the art that example embodiments may be varied and substituted through routine experimentation while still falling within the scope of the following claims. For example, any number of different leakage-reducing structures and shapes aside from torii can be used in example embodiment clamps, simply through proper dimensioning and positioning. Such variations are not to be regarded as departure from the scope of these claims.

What is claimed is:

1. A clamp for a jet pump assembly in a nuclear reactor, the clamp comprising:
   an upper clamp member having an inner surface shaped to fit around a riser pipe of the jet pump assembly, wherein the inner surface of the upper clamp member includes a tongue extending from the inner surface of the upper clamp member and configured to fit in a first groove of the riser pipe so as to prevent vertical movement of the upper clamp member relative to the riser pipe;
   a lower clamp member having an inner surface shaped to fit around the riser pipe of the jet pump assembly, wherein the inner surface of the lower clamp member includes a tongue extending from the inner surface of the lower clamp member and configured to fit in a second groove of the riser pipe so as to prevent vertical movement of the lower clamp member relative to the riser pipe; and
   a vertical connection between the upper clamp member and the lower clamp member configured to draw the upper clamp member and the lower clamp member vertically together.

2. The clamp of claim 1, further comprising:
   a constraint configured to vertically pass through a restrainer bracket of the jet pump assembly between the upper clamp member and the lower clamp member.

3. The clamp of claim 2, wherein the constraint includes a draw bolt passing vertically and entirely through the upper clamp member and the lower clamp member.

4. The clamp of claim 3, wherein the constraint includes two vertically-adjustable bushings on the draw bolt between the upper clamp member and the lower clamp member, wherein the bushings are configured to seat on the restrainer bracket.

5. The clamp of claim 3, wherein the constraint includes a crimp nut on the draw bolt configured to vertically tighten the draw bolt and lock the draw bolt relative to the upper clamp member and the lower clamp member by deformation.

6. The clamp of claim 1, wherein the vertical connection includes a draw bolt passing vertically and entirely through the upper clamp member and the lower clamp member.

7. The clamp of claim 6, wherein the vertical connection includes a crimp nut on the draw bolt configured to vertically tighten the draw bolt and lock the draw bolt relative to the upper clamp member and the lower clamp member by deformation.

8. The clamp of claim 1, further comprising:
   three of the vertical connections, wherein all of the vertical connections are equally spaced about a perimeter of the clamp.

9. The clamp of claim 1, wherein the upper clamp member, the lower clamp member, and the vertical connection are fabricated entirely of at least one of a stainless steel alloy, a zirconium alloy, and an aluminum alloy.

10. A repaired jet pump assembly in a nuclear reactor, the assembly comprising:
   a riser pipe configured to convey a fluid coolant vertically upward;
   two inlet mixers each at a different side of the riser pipe from one another and configured to convey the fluid coolant vertically downward;
   a restrainer bracket connected to the riser pipe and one of the two inlet mixers; and
   a clamp on the riser pipe and passing through the restrainer bracket to prevent relative movement of the riser pipe and the restrainer bracket, wherein the clamp compresses the riser pipe in the vertical direction, wherein the clamp seats into two grooves in an outer surface of the riser pipe, and wherein the clamp compresses the riser pipe by vertically compressing the two grooves together.

11. The repaired jet pump assembly of claim 10, wherein the clamp passes through two entirely separate holes of the restrainer bracket.

12. The repaired jet pump assembly of claim 10, wherein the clamp includes a constraint configured to pass through the restrainer bracket, wherein the constraint includes a draw bolt passing vertically and entirely through the restrainer bracket and a body of the clamp vertically above and below the restrainer bracket.

13. The repaired jet pump assembly of claim 12, wherein the constraint includes a crimp nut on the draw bolt configured to vertically tighten the draw bolt and lock the draw bolt relative to the upper clamp member and the lower clamp member by deformation.

14. The repaired jet pump assembly of claim 12, wherein the constraint includes two vertically-adjustable bushings on the draw bolt between upper and lower ends of the clamp, wherein the bushings are seated against sides of the restrainer bracket.

15. A method of preparing a jet pump assembly having a restrainer bracket for use in a nuclear reactor with a jet pump clamp, the method comprising:
   forming at least one groove in an outer surface of a riser pipe of the jet pump assembly above a restrainer bracket-riser pipe junction point;
   forming at least one groove in the outer surface of the riser pipe below the restrainer bracket-riser pipe junction point; and
   forming at least one hole passing vertically through the restrainer bracket of the jet pump assembly.

16. The method of claim 15, wherein the formings include electrical discharge machining the grooves and the hole.

17. The method of claim 16, wherein the formings are performed during a maintenance outage of the nuclear reactor and after the nuclear reactor has commercially generated electricity.

18. The method of claim 15, further comprising:
   installing a clamp on the riser pipe and the restrainer bracket to prevent relative movement of the riser pipe and the restrainer bracket, wherein the clamp compresses the at least one groove in the outer surface of the riser pipe below the restrainer bracket and the at least one groove in the outer surface of the riser pipe above the retainer bracket together.

19. The method of claim 18, wherein the installing includes passing a constraint of the clamp through the at least one hole in the restrainer bracket.

* * * * *